United States Patent [19]

Wason et al.

[11] Patent Number: 5,262,239

[45] Date of Patent: * Nov. 16, 1993

[54] PRECIPITATED ENCAPSULATED PAPER PIGMENTS AND METHODS

[75] Inventors: Satish K. Wason, Bel Air; Michael C. Withiam, Elkton, both of Md.

[73] Assignee: J. M. Huber Corporation, Rumson, N.J.

[*] Notice: The portion of the term of this patent subsequent to Jun. 15, 2010 has been disclaimed.

[21] Appl. No.: 833,582

[22] Filed: Feb. 12, 1992

Related U.S. Application Data

[63] Continuation of Ser. No. 484,756, Feb. 23, 1990, abandoned, which is a continuation-in-part of Ser. No. 228,584, Aug. 5, 1988, abandoned.

[51] Int. Cl.$^5$ .................. B32B 9/04; C09C 1/02; D21H 17/68
[52] U.S. Cl. .................. 428/403; 106/416; 106/417; 106/461; 106/468; 106/469; 106/482; 106/486; 162/181.1; 162/181.6; 162/181.7; 428/404
[58] Field of Search .............. 428/403, 404, 415, 416, 428/417, 461, 466, 468, 469, 482, 486; 162/181.1, 181.6, 181.7

[56] References Cited

U.S. PATENT DOCUMENTS

| | | | |
|---|---|---|---|
| 2,296,618 | 9/1942 | Patterson | 106/444 |
| 3,849,149 | 11/1974 | Swift et al. | 106/465 |
| 4,026,721 | 5/1977 | Kurrle | 106/288 |
| 4,117,191 | 9/1978 | Kurrle | 428/330 |
| 4,375,373 | 3/1983 | Abe et al. | 106/491 |
| 4,842,772 | 6/1989 | Withiam | 252/601 |

FOREIGN PATENT DOCUMENTS 1228538 4/1971 United Kingdom .

Primary Examiner—George F. Lesmes
Assistant Examiner—Christopher Brown
Attorney, Agent, or Firm—Harold H. Flanders; Robert L. Price

[57] ABSTRACT

A composite pigment product useful as a paper filler pigment comprises a mineral nucleus coated with a substantially continuous substantially uniform coating of an active paper pigment. The active paper pigment coating is preferably formed in situ under alkaline conditions.

11 Claims, 13 Drawing Sheets

PRECIPITATED ENCAPSULATED PAPER PIGMENTS AND METHODS

CROSS REFERENCE TO RELATED APPLICATION

This application is a continuation of application Ser. No. 07/484,756 filed Feb. 23, 1990, now abandoned, which is a continuation-in-part of Ser. No. 07/228,584, filed Aug. 5, 1988, now abandoned.

TECHNICAL FIELD

This invention relates to novel composite paper pigments and methods for their preparation, and more particularly relates to paper pigments useful as fillers and comprising a mineral nucleus coated with a substantially continuous uniform layer of a material which functions as a paper pigment.

BACKGROUND ART

It is well known in the art to use various types of minerals as paper coating and filler pigments. In particular, sodium aluminosilicates are well known as paper fillers, as are various forms of clay such as kaolin. It is also known in the art to modify minerals by application of surface coatings of various inorganic compositions. Thus, U.S. Pat. No. 3,849,149 to Swift et al, 1974, discloses a method of modifying the surface properties of particulate mineral materials by forming on the surface of the particles a coating which has a significant number of acidic sites. According to this patent, the surface of certain natural aluminosilicate minerals including kaolin and bentonite can be modified to give an enhanced acidic reaction by a procedure involving heat treatment. This patent also discloses that the surfaces of such clay mineral particles can be provided with acidic coatings to achieve reproducibly a variety of acidic surfaces. This patent discloses a pigment or filler material consisting of a particulate mineral such as kaolin or bentonite having a surface coating which has a significant number of acidic sites which have PKA values of less than 2.8. A main object of this patent is to place the acidic surface coatings on the mineral so that additional coatings of organic materials such as silanes can be applied to the mineral.

U.S. Pat. Nos. 4,026,721, 4,072,537, and 4,117,191 to Kurrle, disclose a composite silicate pigment for use in paper prepared by a precipitation reaction wherein spherical, hydrous metal silicate particles are precipitated on the planar surfaces of clay particles which have a platelet type structure. This composite pigment in the specific embodiment of these patents is a kaolin clay component having a platelet type structure with a planar surface and having a metal silicate component in the form of spherical particles of an alkaline earth metal silicate precipitated on the planar surfaces of the clay platelets. According to this patent, when incorporated into paper, the metal silicate particles act as spacers between individual clay particles to create additional air interfaces on sheet drying.

In published PCT Application No. WO 87/07884, published Dec. 30, 1987, of this assignee, there are disclosed compositions which may be used as paper pigments which comprise reaction products of kaolin with an alkali metal silicate or similar reactant. In these compositions, there is produced an altered kaolin nucleus which has a rim, edge or border which comprises the reaction product of the kaolin and the alkali metal silicate or similar reactant. Thus this product is not a composite pigment but rather is the reaction product of the kaolin with the alkali metal silicate or similar reactant.

The present invention provides an improved coated mineral pigment which is useful as a paper pigment, coating pigment and filler which is distinct from these prior art compositions.

DISCLOSURE OF THE INVENTION

It is accordingly one object of the present invention to provide a novel mineral pigment useful as a paper pigment.

A further object of the invention is to provide a paper pigment comprising a precipitated, encapsulated composite product which contains a substantially inert mineral nucleus containing a substantially uniform coating of an active paper pigment.

An even further object of the present invention is to provide a precipitated, encapsulated composite product useful as a paper pigment and as a filler which comprises a mineral nucleus having coated thereon a substantially continuous substantially uniform layer of a silicate reaction product or equivalent.

Also provided by the present invention is a novel process for preparation of the composite products of the invention.

Other objects and advantages of the present invention will become apparent as the description thereof proceeds.

In satisfaction of the foregoing objects and advantages there is provided by this invention a precipitated, encapsulated composite product comprising a mineral nucleus substantially coated with a layer of substantially continuous uniform coating of an active paper pigment.

The present invention also provides a method for production of this composite product by formation of the active paper pigment coating in situ in the presence of the substantially inert mineral nucleus, the reaction being carried out under alkaline conditions.

The present invention also provides a paper containing a filler pigment which comprises a composite product comprising a mineral nucleus coated with a layer of a substantially continuous uniform coating of an active paper pigment.

BRIEF DESCRIPTION OF DRAWINGS

Reference is now made to the drawings accompanying the application wherein.

BEST MODE FOR CARRYING OUT THE INVENTION

Figure 1:
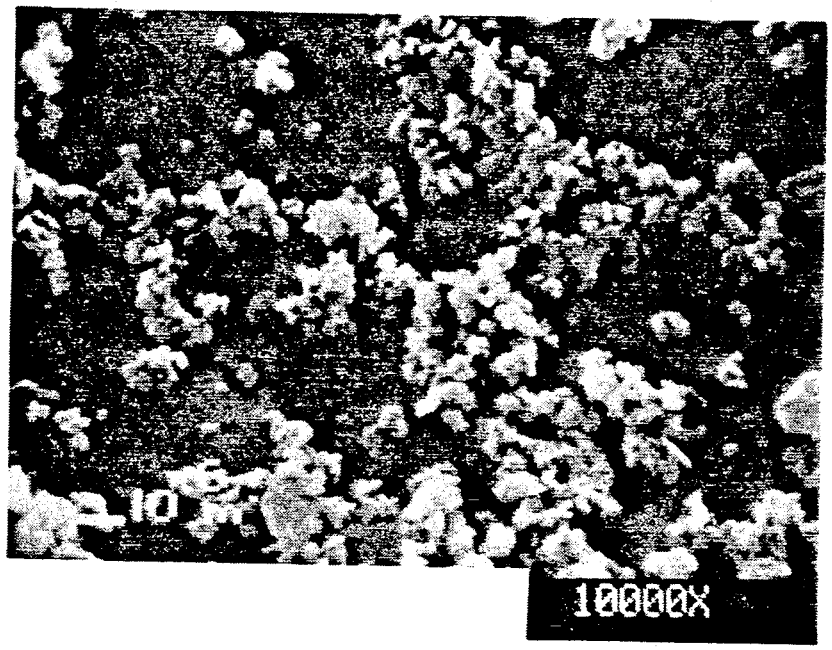
FIG. 1 is an SEM photomicrograph magnified 10,000 times of a milled product produced according to a specific embodiment of the invention.

The product of this invention is a precipitated, encapsulated composite product which comprises a mineral nucleus or core which is coated or encapsulated with a substantially continuous substantially uniform layer of an active paper pigment. The coating is substantially uniform and encases at least about 80% and preferably up to 100% of the mineral nucleus. The thickness of the coating may range from about 0.3 microns to about 1.0 microns.

In this invention the term "active paper pigment" means any material which will enhance the characteristics of paper when incorporated therein. By this is meant that the active paper pigment will increase the opacity, sheet brightness and/or optical performance of paper by standard methods of measurement. In general, such active paper pigments include metal silicates, precipitated silicas, alkali metal aluminocarbonates, and the like as better described hereinafter.

The composite products of the present invention provide paper enhancement characteristics equivalent to or better than conventional paper pigments even though the major portion of the product is not a paper pigment. Thus, the composite product of the invention achieves all the advantages of an active paper pigment at substantially lower cost because a substantial portion of the product is a material significantly lower in cost than the active paper pigment.

The products of the present invention exhibit an unexpected increase in performance as paper fillers and paper coatings over the average performance which one would expect from the individual components or a physical blend. Thus, it has been found that the TAPPI opacity is increased over comparative measurements for either the mineral nucleus or the active paper pigment measured under the same conditions. Similarly, brightness of paper is increased by the product of the present invention as compared with the mineral nucleus. Moreover, the product of the present invention exhibits improved values over a physical blend of the mineral nucleus and the active paper pigment.

On a weight basis, the product of the present invention will contain from about 10% to about 90% of the active paper pigment to about 90% to 10% of the mineral nucleus. With respect to opacity, the preferred amount of active paper pigment contained in the composition should range from about 25 to 75% by weight with the mineral nucleus comprising from about 75 to 25% by weight. With respect to brightness, it is preferred that the active paper pigment comprise from about 75 to 95% by weight with the amount of mineral nucleus comprising from about 5% to 25% by weight.

The product of the present invention may be prepared by any procedure which will produce a paper pigment having good characteristics in which a mineral nucleus is substantially encased within a substantially uniform layer of an active paper pigment. However, according to the present invention, it has been found that for best results, the product should be prepared under alkaline conditions and the active paper pigment under in situ conditions in the presence of the mineral nucleus. A particularly preferred method of preparation is to provide an agitated reactor and prepare the product under batch conditions. Under such procedures, the reactants required for forming the product are preferably added simultaneously to the agitated reactor over a short period of time. It is generally preferred to initially begin addition of the reactants necessary to form the active paper pigment until formation of the active paper pigment actually begins. At that point, a slurry of the mineral nucleus material is added to the agitated reactor either all at once or slowly. Thereafter, the remaining reactants are continued to be added under alkaline conditions until all reactants are added and the reaction is completed. The resulting composite product is then recovered, preferably washed to remove impurities such as soluble salts and the product recovered. Milling of the product and possibly spray drying may also be carried out to form the final product.

In this reaction for preparation of the product, it is preferred to conduct the reaction so as to provide a steady and gradual increase in reaction pH until the reaction is completed. The reaction in the presence of the mineral nucleus is usually operated at a pH of above 7.0 and preferably at a pH in the range of about 8.0 to 9.0. The final pH for the reactions may range from 5.0 to 10.0, depending on the reaction and use of the final product. The temperature of the reaction preferably ranges from about 40° C. to 100° C. and more preferably from about 50° C. to 75° C.. The reaction is carried out under batch conditions, usually at atmospheric pressure.

In formation of the products of the present invention, the preferred mineral nucleus is substantially inert and is a mineral including kaolins, kaolinites, talcs, micas, serpentinite, montmorillonites, or acid leached minerals such as clays or bauxite. A commercially available acid leached clay is Essellar ®, from J. M. Huber Corporation. Other mineral nuclei which may be used include hydrated alumina, precipitated calcium carbonate (PCC), ultrafine ground limestone (UFGL), magnesium carbonate, and diatomaceous earths. Obviously equivalent materials and mixtures of these materials may also be used in the invention.

The coating to be applied to the mineral may comprise any active paper pigment which is operable in accordance with the process of the invention and which will form a substantially uniform and continuous coating so as to substantially encapsulate the mineral. The active paper pigment is preferably a metal silicate including synthetic alkali metal silicates, synthetic alkali metal aluminosilicates, synthetic alkaline earth metal silicates, synthetic alkaline earth metal aluminosilicates, and mixtures thereof. Other active paper pigments which may be used are precipitated silicas, alkaline earth aluminocarbonates, and mixtures thereof.

Within these groups of reactants, certain combinations are particularly useful and the following Table 1 shows a matrix of illustrations of useful and preferred combinations within the scope of the invention.

TABLE 1

Matrix Illustration of Useful Combinations

| | Nuclei | | | | | Coatings | | |
|---|---|---|---|---|---|---|---|---|
| | Clay Minerals | Hydrated $Al_2O_3$ | UFGL | PCC | Diatomaceous Earth | Silicates | Silicas | Alumino Carbonates |
| Caly Minerals | . | . | . | * | . | * | * | * |
| Hyd $Al_2O_3$ | . | . | . | * | . | * | * | * |
| UFGL | . | . | . | * | . | * | * | * |
| PCC | * | * | * | . | * | * | * | * |
| Diatomaceous earth | . | . | . | | | * | * | * |
| Silicates | | | | | | * | * | * |
| Silicas | | | | | | | * | * |
| Alumino Carbonates | | | | | | | | * |

*Useful combinations

A particularly preferred embodiment of the invention includes kaolinite mineral nuclei with synthetic alkali metal silicates and synthetic alkali metal aluminosilicates being coated thereon. Preferred kaolinite nuclei for use in the invention are the clays sold commercially by the J. M. Huber Corporation under the tradename Hydragloss ® and Hydrasperse ®.

A particularly preferred coating material is a modified precipitated aluminosilicate pigment such as described in U.S. Pat. Nos. 3,798,046, 3,909,286 and its reissue RE 30,568, all to Robert C. Fitton, and assigned to the same assignee as the application. The disclosures of each of these three patents are specifically incorporated herein by reference. The pigments disclosed in these patents are alkaline earth modified alkali metal aluminosilicate pigments. These pigments are produced by introducing dilute solutions of an alkali metal silicate and a water soluble salt of aluminum and a strong acid, such as aluminum sulfate, into an aqueous reaction media containing dispersed therein an alkaline earth metal salt or hydroxide. When solutions of the alkali metal silicate and aluminum sulfate are added to the reaction mass which contains the alkaline earth metal salt or hydroxide, the latter serves as a nucleus or nucleating agent which alters the structure of the resulting modified pigment. Thus, when this pigment serves as a coating on the mineral in the present invention, the nucleus or mineral core will comprise an alkaline earth metal salt or hydroxide having coated thereon the reaction product of the alkali metal silicate and aluminum sulfate.

The preferred pigments described herein are finely divided precipitated white powdery compositions which comprise chemically bound oxides of magnesium, sodium, aluminum and silicon in a uniform matrix, substantially all of the discreet particles of which are less than one micron in diameter. The molar ratio of $SiO_2$ to $Na_2O$ is about 10.0 to 13.0:1 and the molar ratio of $Na_2O$ to $Al_2O_3$ is from about 0.3 to 1.0:1. The alkaline earth metal oxide is present in an amount of from about 0.1 to 8% based on the dry weight of the composition having a specific gravity of 2.0 to 2.4. The preferred silicate of this patent includes magnesium as an alkaline earth metal and sodium as the alkali metal.

Figure 4:
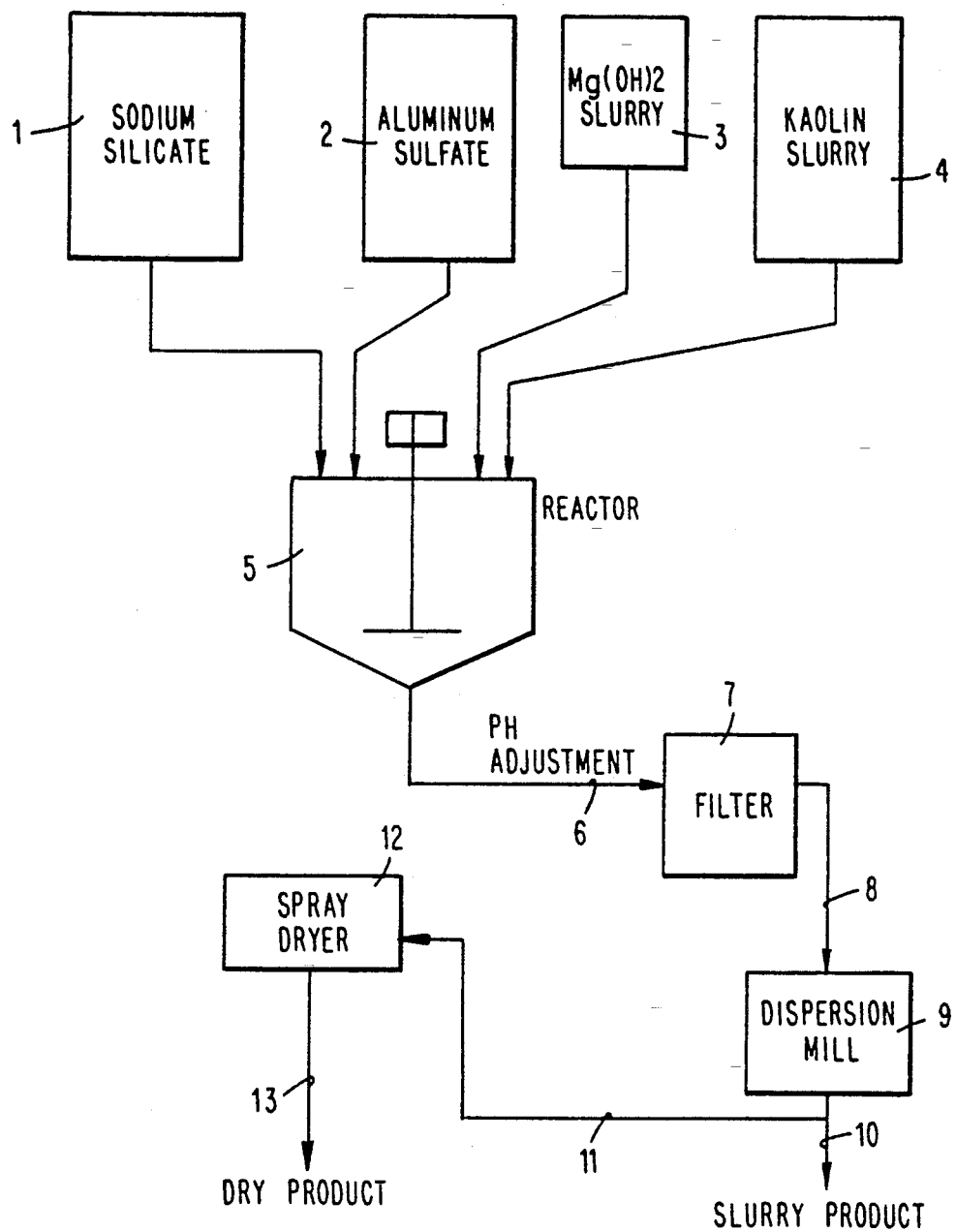
FIG. 4 is a process flow diagram for preparation of a product according to a specific embodiment of the invention.

A particularly preferred method for practicing the process of the present invention is set forth in the process flow diagram of FIG. 4. This flow diagram illustrates the preferred embodiment wherein the mineral is kaolinite and the coating is a sodium magnesium aluminosilicate product of the type described in Fitton Reissue Pat. No. 30,568. In this process, aqueous reaction media of sodium silicate, aluminum sulfate or alum and magnesium hydroxide are prepared and placed in reactors 1, 2 and 3, respectively as shown. A slurry of kaolinite or kaolin is provided in reactor 4. Agitated reactor 5 is provided which is maintained under good conditions of agitation. The magnesium hydroxide reaction medium is added to the reactor and a small amount of the aluminum sulfate solution is then added to the magnesium hydroxide. At this point, the remaining aluminum sulfate and sodium silicate solutions are continued to be added simultaneously at temperatures generally in the range of about 50°–100° C., preferably 60° C., while maintaining the slow addition rate with good agitation. At this point the slurry of kaolin is added while maintaining sufficient agitation to suspend the kaolin particles and while continuing the simultaneous addition of the aluminum sulfate and sodium silicate. The total time for addition of the kaolin slurry is usually less than about ten minutes on a batch basis. After the kaolin is added, the remaining silicate and aluminum sulfate solutions are continued to be added for a period of time ranging from 20 minutes to 1 hour. Thereafter the addition of the aluminum sulfate is discontinued and the reaction slurry is stirred until the precipitation/encapsulation reaction is complete. The pH is then adjusted to the range of about 8.0 to 10.0 by addition of excess sodium silicate solution for this reaction. The resulting slurry is then passed to filter 7 from which the product is removed by line 8 to dispersion mill 9 for grinding to a desired particle size. The product may then be recovered at line 10. Optionally, where additional drying is desired, the product is passed by line 11 to drier 12 from which the dried product is recovered at 13.

It is of course to be understood that any reaction procedure can be used if sufficient reaction time is provided for the paper pigment reactant to form the generally uniform coating on the mineral nucleus. For example the magnesium hydroxide and kaolin slurry could be provided in the reactor to which aluminum sulfate is added with agitation. Thereafter the sodium silicate solution can be added simultaneously with aluminum sulfate solution in sufficient rates to provide a gradual increase in pH during precipitation. Thereafter the pH of the reaction slurry is adjusted to the desired range.

The following examples are presented to illustrate the invention but it is not to be considered as limited thereto. In the Examples and throughout the specification, parts are by weight unless otherwise indicated.

EXAMPLE 1

A batch of pigment is prepared by adding to 1020g of $H_2O$ at 60° C., 248.40 g of clay slurry containing 69.79% kaolin and sufficient $Mg(OH)_2$ slurry to provide 0.53% $Mg(OH)_2$ in the total aqueous slurry. To this slurry, clarified alum is added with agitation to yield a concentration of 0.75% $Al_2(SO_4)_3$. To this slurry, 831.6 g of sodium silicate solution containing 8.69% $Na_2O$ and 22.39% $SiO_2$ is added simultaneously with 349.35 g of alum solution containing 28.33% $Al_2(SO_4)_3$. Rates of addition are adjusted to provide a gradual increase in pH during the precipitation. Sufficient agitation to suspend the kaolin particles is maintained. The final reaction slurry is adjusted to 9.2 pH. The pigment is recovered by filtration, washed, and dispersed to form a pigment slurry. The slurry may, depending on the specific application, be dried and milled. A finely divided pigment results.

EXAMPLE 2

A batch is produced by preparing 1031.41 g of an aqueous reaction medium containing 0.65% $Mg(OH)_2$. Clarified alum is added slowly with agitation to yield a concentration of 0.92% $Al_2(SO_4)_3$ at 60° C. At his point, simultaneous addition of alum and sodium silicate containing 28.33% Al $(SO_4)_3$ at 60° C. and containing 8.69% $Na_2O$ and 22.39% $SiO_2$, at 60° C., respectively is started and continued at a slow rate while maintaining good agitation for 6.5 minutes. At this point, the addition of 154.20 g of a slurry of clay containing 69.70% kaolin is started while maintaining sufficient agitation to suspend the kaolin particles and continuing simultaneous addition of alum and sodium silicate. Total clay addition requires preferably less than 5 minutes. Additions of silicate and alum solution are continued for a total of 35 minutes. The addition of alum is discontinued and the reaction slurry brought to 9.2 pH with excess sodium silicate solution. The pigment is recovered and washed to remove soluble salts. The washed pigment slurry is adjusted to pH of 8.0 with alum containing 28.33% $Al_2(SO_4)_3$. The pigment slurry is milled to produce finely dispersed particles before being dried and milled. This product is useful either in dry or in slurry form depending on the specific application.

EXAMPLE 3

Rather than producing the expected paper optional performance, samples of pigments prepared by the method of Example 2 exhibit an unexpected boost in performance over the weighted average performance of the individual components or the physical blend. Table 2 following illustrates the performance advantage gained from pigments of this invention. In Table 2 the effect of the level of kaolin present in the pigment on paper optical properties is illustrated. In Table 2 the paper optical performance is presented as determined by actual tests and based on a calculated performance. The pigment composition obtained according to the method of Example 2 contained 70% of the sodium magnesium aluminosilicate formed as a precipitate and 30% of kaolin nucleus. The pigments were evaluated in paper with respect to TAPPI opacity and with respect to ISO brightness. The table sets forth the actual performance for both opacity and brightness at low levels of 3% and 6% and compares actual performance, calculated performance, and the performance of a physical blend of the kaolin and the sodium magnesium alumino pigment or precipitate. Note that the calculated performance includes the performance for the reaction product as well as for each of the individual components, kaolin and precipitate.

TABLE 2

Paper Optical Performance Actual vs Calculated Pigment composition of 70% precipitate and 30% Kaolin

| Pigment | TAPPI Opacity | | ISO Brightness | |
|---|---|---|---|---|
| | 3% filler | 6% filler | 3% filler | 6% filler |
| Actual performance | 84.1 | 86.9 | 86.3 | 87.2 |
| Calculated Performance (70/30) | 82.9 | 85.6 | 86.1 | 87.0 |
| 100% Kaolin | 81.0 | 84.0 | 84.4 | 83.9 |
| 100% Precipitate | 83.7 | 86.3 | 86.8 | 88.3 |
| Physical Blend (70/30) | 83.0 | 85.6 | 86.5 | 87.3 |

In the following Table 3, the effect of the level of kaolin nucleus present in the pigment on paper optical properties is illustrated. In this work, the procedure of Example 2 was used while varying the amount of kaolin as the mineral nucleus and the amount of coating or active paper pigment being formed. From the table it will be seen that the pigment composition contains precipitate and kaolin ranging from 0% to 100% in increments of 25. Thereafter optical performance of the pigments was evaluated by preparing handsheets using accepted standard TAPPI methods. In all cases samples of pigments were added as slurries to a standard pulp blend to yield the single filler fine paper furnish. Handsheets were evaluated using standard ISO methods (2469, 2470, 2471, and 3680) for determining paper opacity (calculated TAPPI) and brightness (ISO). Optical properties were measured using a Technidyne, Technibright TB-1C. In this table it will be seen that the preferred products with respect to opacity will contain at least about 25% of the precipitate and from about 25-75% of the kaolin nucleus. With respect to brightness, greater amounts of the precipitate appear to increase the brightness values. The table indicates that 6% filler amounts using at least 50% of the paper active pigment or precipitate provides the excellent brightness values. Table 3 is as follows:

TABLE 3

Paper Optical Performance vs Pigment Composition

| Pigment Composition | | TAPPI Opacity | | ISO Brightness | |
|---|---|---|---|---|---|
| % Precipitate | % Kaolin | 3% filler | 6% filler | 3% filler | 6% filler |
| 0 | 100 | 81.0 | 84.0 | 84.4 | 83.9 |
| 25 | 75 | 82.4 | 85.3 | 85.1 | 85.3 |
| 50 | 50 | 83.8 | 86.5 | 85.8 | 86.6 |
| 75 | 25 | 84.2 | 87.0 | 86.3 | 87.2 |
| 100 | 0 | 83.7 | 86.3 | 86.8 | 88.3 |

Note: Pigment reduced using procedure outlined in Example 2.

The increase in performance realized by use of the product of the invention is a result of improved light scattering capability of the pigment. It appears to be superior to other pigments which are commonly used as fillers in paper. In the following Table 4 are set forth pigment scattering coefficients for various combinations of the composite pigment of this invention using from 50% to 80% of the active paper pigment in combination with from 20% to 50% of a kaolin nuclei of a product of the type prepared in Example 2. Comparisons of the scattering coefficient values were made for each of these combinations and compared with the same scattering coefficient values for a calcined clay and a precipitated sodium aluminosilicate. The scattering coefficient data were calculated using the appropriate Kubelka-Munk equations. The data is reported for a loading level of 6% filler.

As may be seen from Table 4, all values of the product of the invention are substantially improved over calcined clay or precipitated silicate and particularly excellent values are shown in products which contain up to 70 to 80% of the active paper pigment in combination with 20-30% of the kaolin nucleus. Table 4 is as follows.

TABLE 4

| Pigment Scattering Coefficient | | |
|---|---|---|
| Pigment Composition | | Scattering Coefficient |
| % Precipitate | % Kaolin | @ 6% filler, S, cm$^2$/g |
| 50 | 50 | 2657 |
| 65 | 35 | 2779 |
| 70 | 30 | 2903 |
| 80 | 20 | 3004 |
| calcined clay | — | 2343 |
| precipitated silicate | — | 2572 |

EXAMPLE 4

In this Example, the process of Example 2 is repeated except that in this procedure, Scanning Electron Micrographs (SEM) of the product were made at various steps of the reaction in order to show development of the product. These SEM photographs are shown in the attached FIGS. 5A, 5B, 5C, 5D, 5E, 5F, 5G, 5H and 5I. All of the SEM photographs were taken at 10,000× magnification.

Figure 5A:
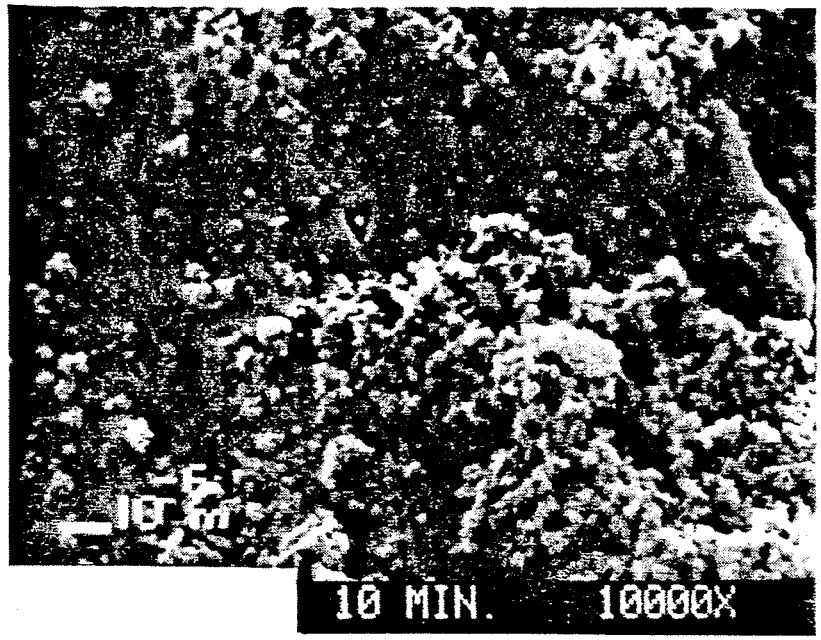
FIGS. 5A-5I are SEM photomicrographs at 10,000× magnification showing a timed sequence of the appearance of products of a specific embodiment according to the present invention.
Figure 5B:
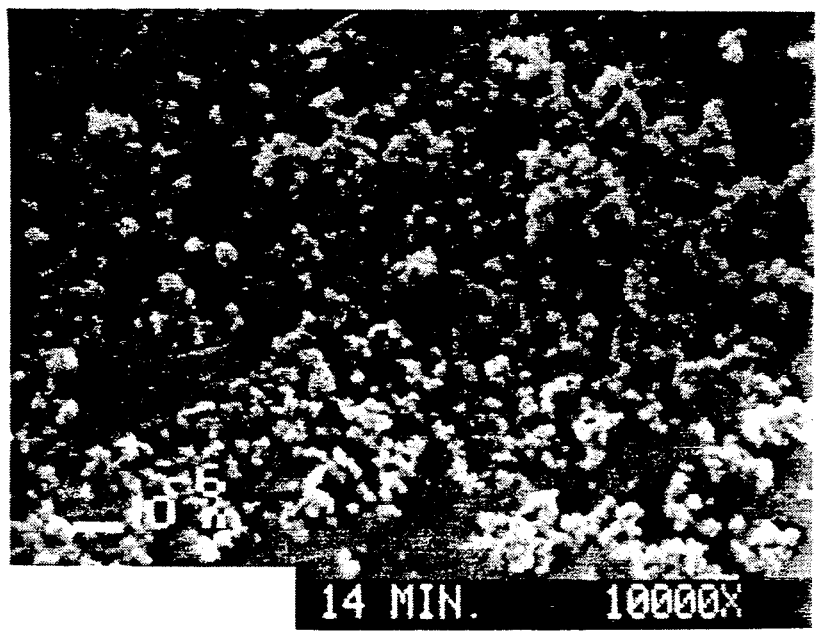
Figure 5C:
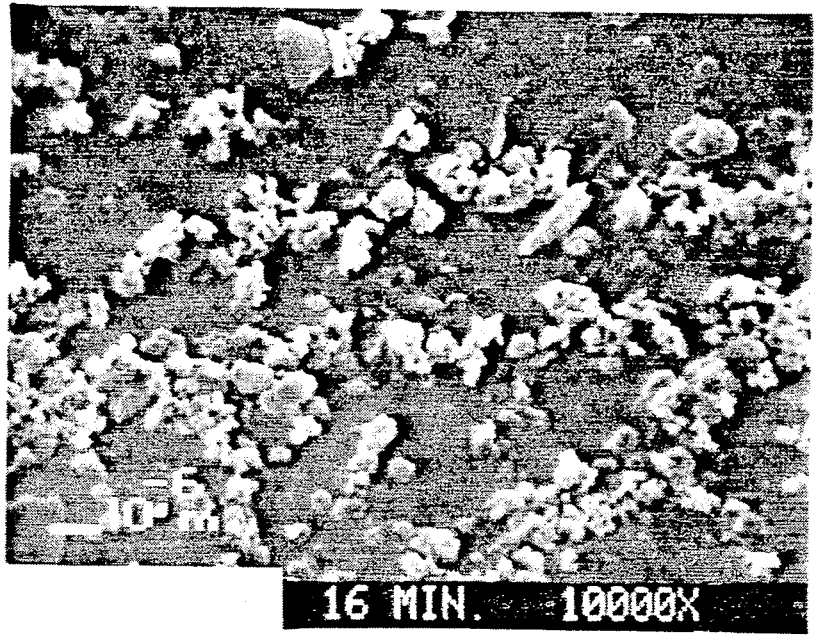
Figure 5D:
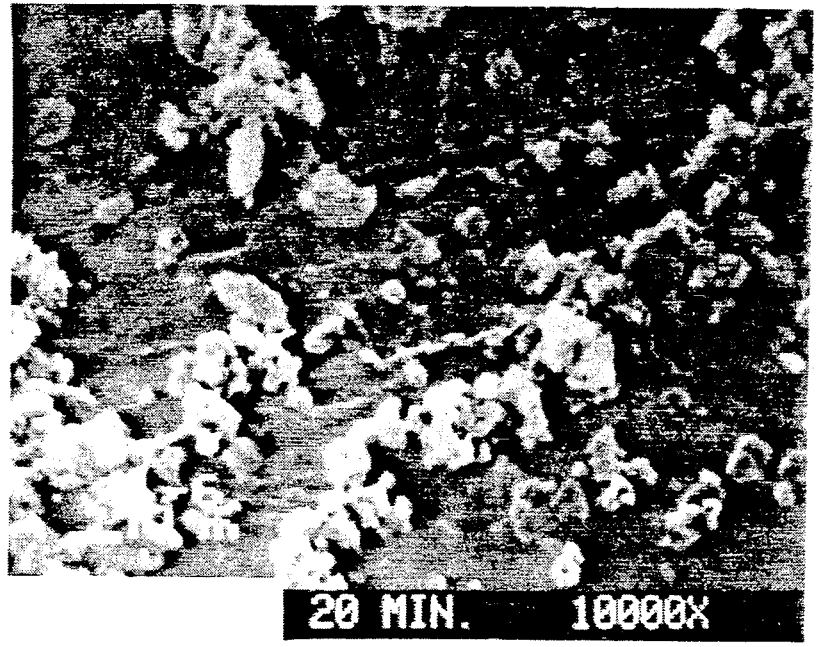
Figure 5E:
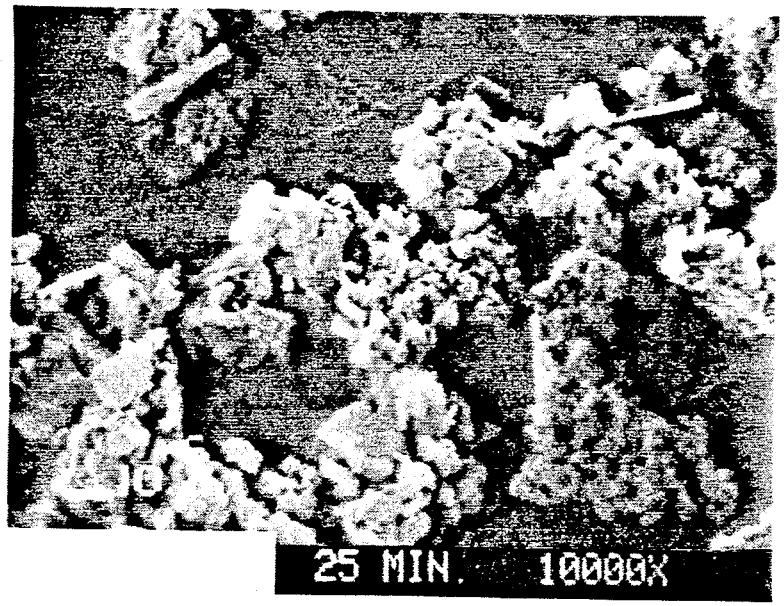
Figure 5F:
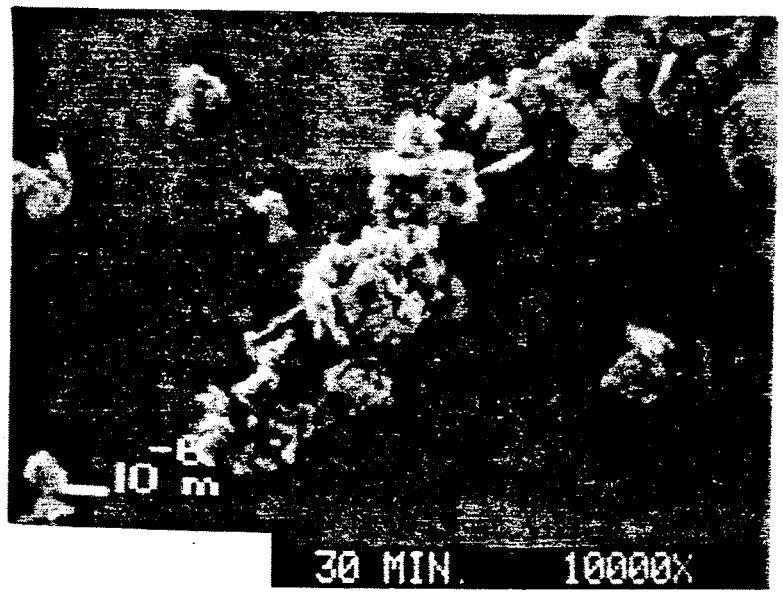
Figure 5G:
Figure 5H:
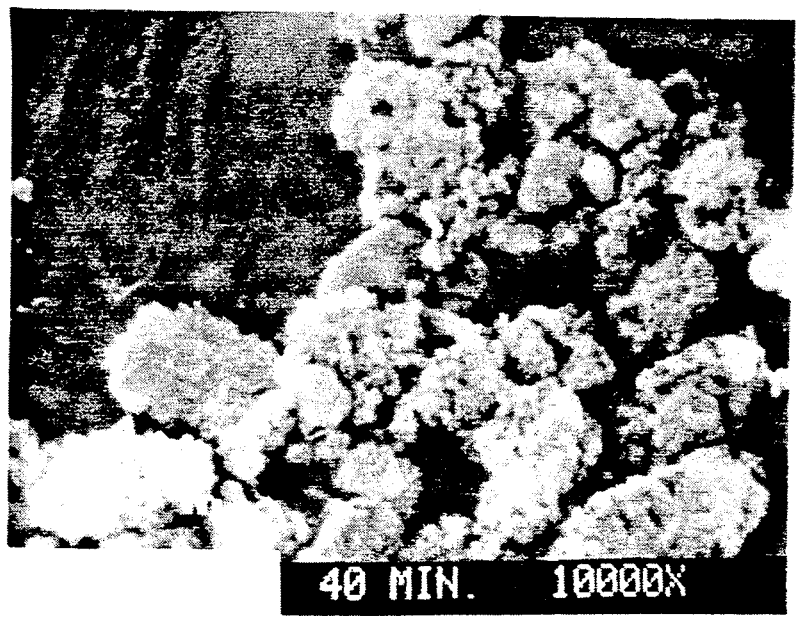
Figure 5I:
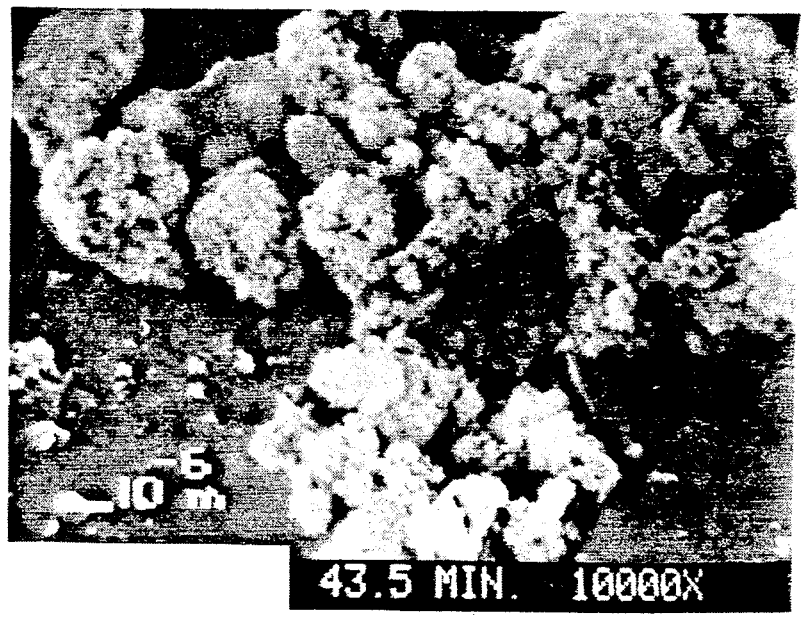
Figure 6A:
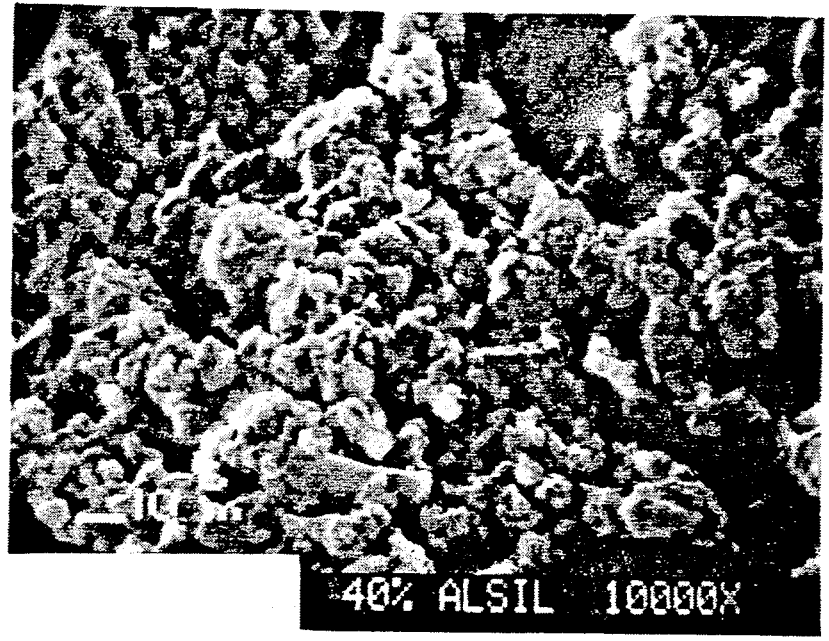
FIGS. 6A-6C are SEM photomicrographs of products produced according to Example 1 of Kurrle U.S. Pat. No. 4,026,721.
Figure 6B:
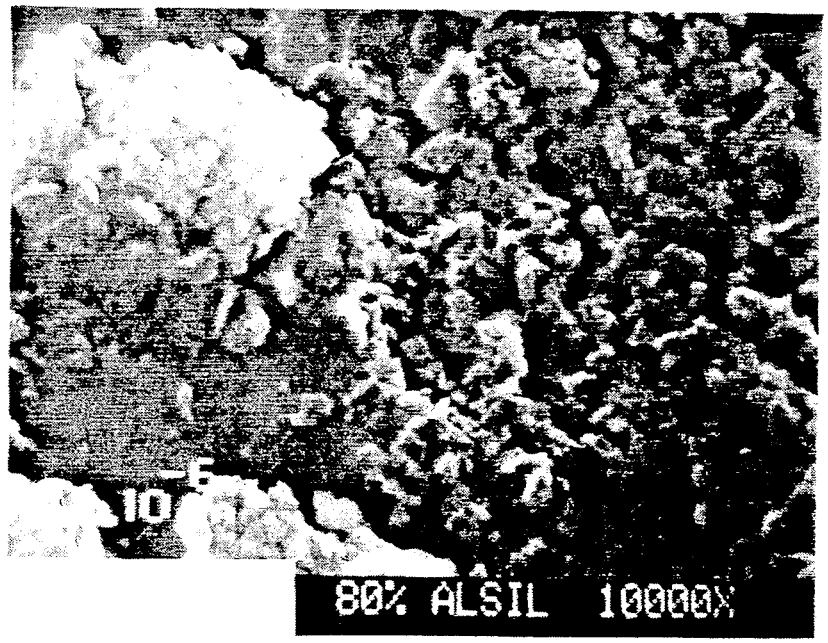
Figure 6C:
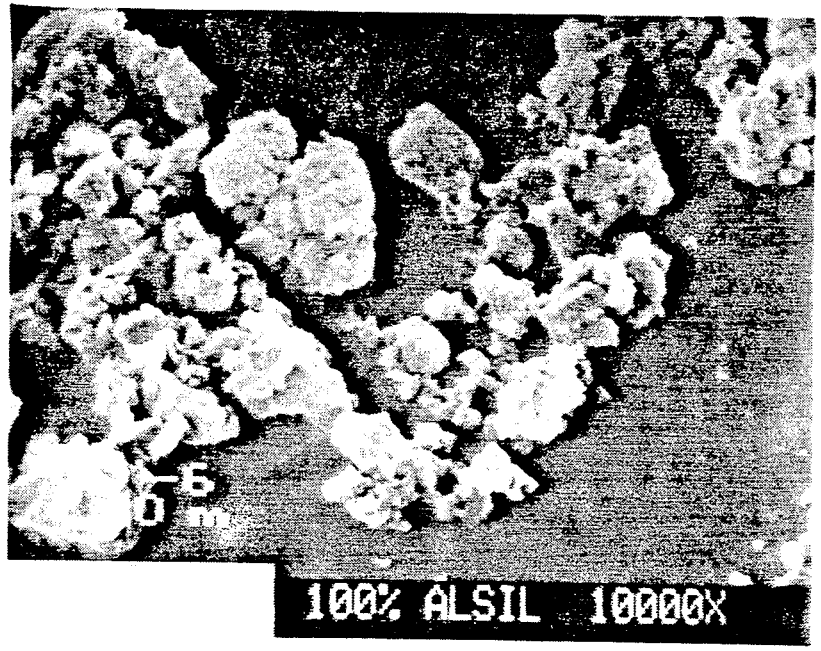
Figure 7A:
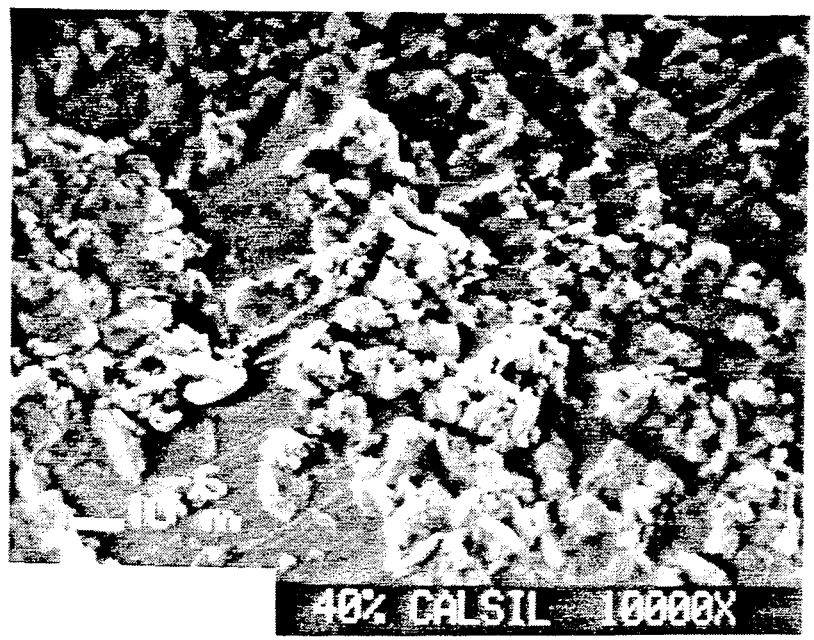
FIGS. 7A-7C are SEM photomicrographs at 10,000× magnification of products produced according to Example 2 of Kurrle U.S. Pat. No. 4,026,721.
Figure 7B:
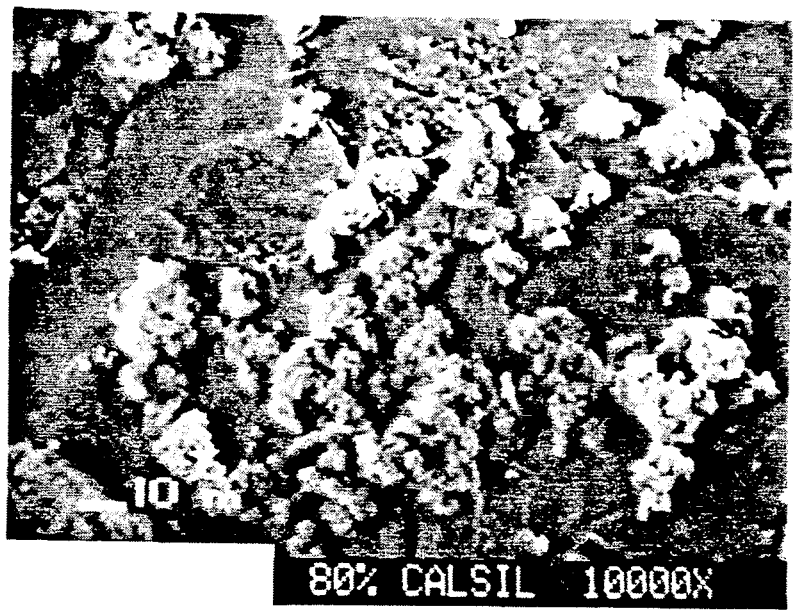
Figure 7C:
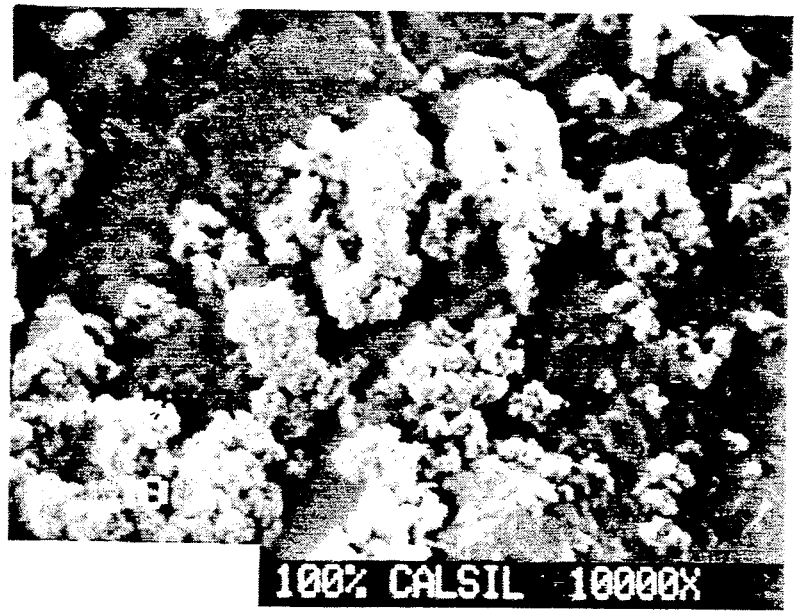

With reference to FIGS. 5A and 5B, it will be seen that in FIGS. 5A and 5B, at 10 and 14 minutes into the reaction, the modified alkali metal aluminosilicate material is forming as a product prior to addition of any of the kaolin. The kaolin slurry is added 15 minutes into the reaction. FIG. 5C at 16 minutes shows the mixture of uncoated kaolin particles and the formed modified alkali metal aluminosilicate. FIGS. 5D, 5E, 5, 5G, 5H and 5I show formation of the products continuing at 20 minutes, 25 minutes, 30 minutes, 35 minutes, 40 minutes and 43.5 minutes, respectively. The photomicrograph of FIG. 1 shows the final product after precipitation is complete.

From this series of timed photographs, it will be seen that the modified alkali metal aluminosilicate product is initially formed and then precipitates onto the surfaces of the kaolin platelets or particles.

EXAMPLE 5

Figure 2:
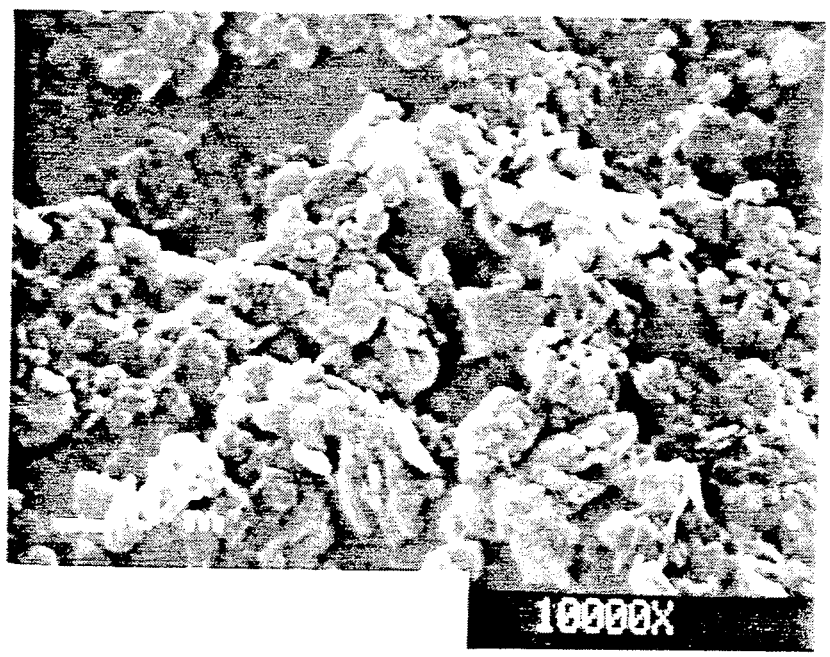
FIG. 2 is an SEM photomicrograph magnified 10,000 times of a commercial kaolin clay product, Hydrasperse ®, which can be used as a starting material in preparation of the products of the invention.

In order to assess the characteristics of the product produced by Example 2, a comparison was made using SEM photographs of the mineral nucleus, a kaolin clay particle, in this case Hydrasperse ®, a commercial kaolin clay available from J. M. Huber Corporation, a simple mixture of the kaolin clay Hydrasperse ® and the commercial modified alkali metal alumino silicate product, and the product of Example 2. FIG. 2 shows the kaolin clay product, FIG. 3 shows the physical mixture of the kaolin clay and the modified alkali metal aluminosilicate and FIG. 1 shows the milled form of the final product of Example 2, all of these particles being shown at 10,000× magnification.

Figure 3:
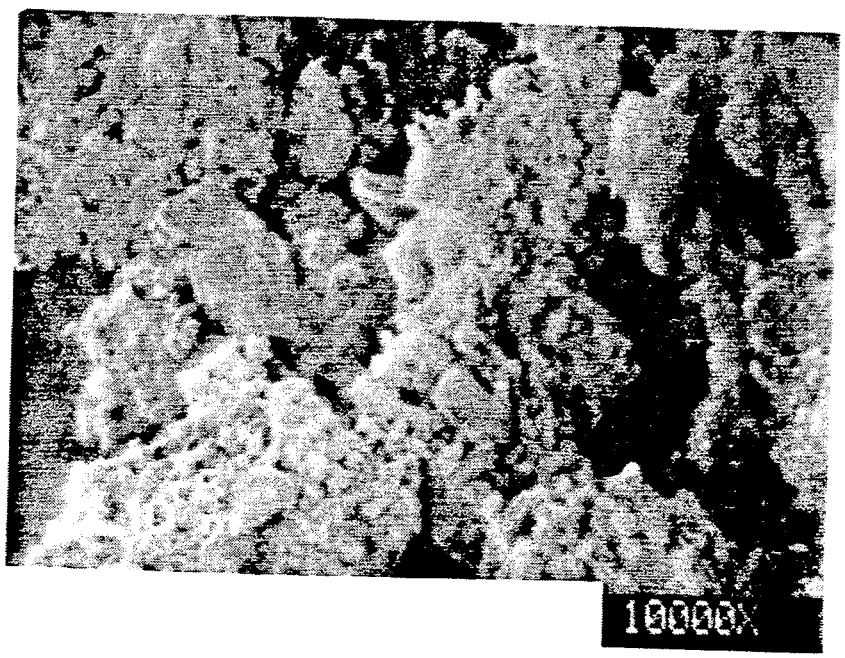
FIG. 3 is a physical mixture of an active commercial modified alkali metal alumino silicate paper pigment, and the Hydrasperse ® kaolin clay of FIG. 2 magnified 10,000 times.

A comparison of FIGS. 1, 2 and 3 shows a clear difference in particle shape, appearance and size between the starting kaolin clay of FIG. 2, the physical mixture of the commercial modified alkali metal aluminosilicate paper pigment and the kaolin Hydrasperse ® and the product according to the present invention of FIG. 1. The product of FIG. 1 contains more uniform particles and illustrates a generally continuous and uniform coating.

EXAMPLE 6

The apparent similarity between the product as disclosed in U.S. Pat. No. 4,026,721 to Kurrle prompted a repeat of the work of Kurrle as in his Example 1. The product produced according to U.S. Pat. No. 4,026,721 to Kurrle is a calcium silicate formed in situ by reaction between calcium chloride and sodium silicate, the calcium silicate reaction product then being deposited on planar surfaces of a kaolin substrate. According to the patent, the calcium silicate is deposited as spherical particles. In the following work, the calcium silicate is referred to as Casil. A series of pigments representing 100% synthetic pigment, 80% synthetic Casil/20% kaolin, and 60% synthetic Casil/40% kaolin, were repeated as outlined. The experiment was repeated using Hydragloss ® 90 clay slurry in dry form. All reactant concentrations were specifically duplicated, however; 3.33 MR sodium silicate was substituted for the 3.22 MR specified.

Figure 8:
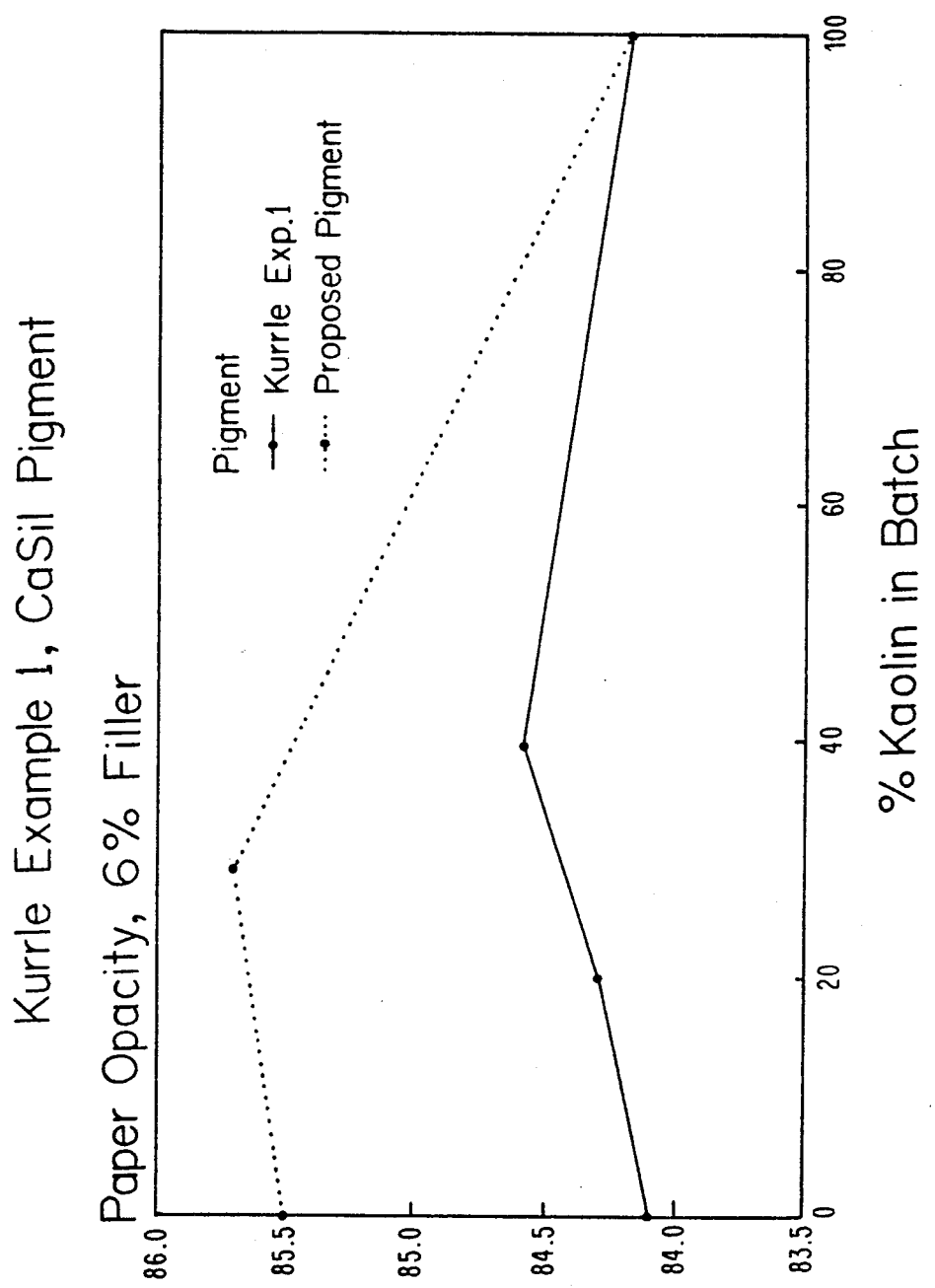
FIG. 8 is a paper performance comparison of the product of Example 1 of U.S. Pat. No. 4,026,721 of Kurrle compared to the product of the present invention.

Paper optical properties were measured on handsheets prepared from the Kurrle pigments and compared with pigments of this invention. FIG. 8 illustrates the level of performance by the pigments of Example 2 (at various levels of kaolin) as compared with the Kurrle pigments. At all levels of kaolin content, the Kurrle pigments are deficient in paper optical performance when compared to the products of Example 2.

EXAMPLE 7

In additional work, Kurrle Example 1 was repeated but substituting Al$_2$(SO$_4$)$_3$·14 H$_2$O for CaCl$_2$·2H$_2$O in the Kurrle reaction. The replacement was made on an equivalent moles of metal oxide basis (i.e., 1Al$_2$O$_3$=-1CaO). Reaction concentrations were duplicated, however, once again 3.33 MR sodium silicate was substituted for the 3.22 MR specified. Additional aluminum sulfate which was added by Kurrle for pH adjustment was added or deleted as required to attain the pigment pH specified in the patent. Samples of pigment were prepared that contained 40%, 20% and 0% kaolin, respectively.

Chemical analysis of the synthetic pigment (containing 40% kaolinite) was then compared with the synthetic pigment produced by Example 2 (containing 40% kaolin). It is obvious that the pigments produced have only slight similarities in composition. The pigment of Example 2 of this invention (containing 40% kaolin) has substantially more Na$_2$O and Al$_2$O$_3$, as well as the additional MgO.

| | Chemical Composition Comparison | |
|---|---|---|
| Al$_2$(SO$_4$)$_3$ | Pigment of this invention | Kurrle |
| % LOI | 12.0 | 11.5 |
| % SiO$_2$ | 57.8 | 66.6 |
| % Al$_2$O$_3$ | 21.7 | 17.1 |
| % Na$_2$O | 4.6 | 2.5 |
| % MgO | 0.9 | — |
| % Na$_2$SO$_4$ | 3.1 | 4.3 |
| | | Pre dried, 2 hrs, 105° C. |

Pigment of this invention = 0.35 Na$_2$O:0.10 MgO:Al$_2$O$_3$:4.53 SiO$_2$:3.14 H$_2$O.
Kurrle = 0.24 Na$_2$O:Al$_2$O$_3$:6.63 SiO$_2$:3.81 H$_2$O.

The claimed pigment is produced with 2.6 MR silicate which could account for a portion of the differences in $SiO_2$ level in the chemical composition.

Figure 9:
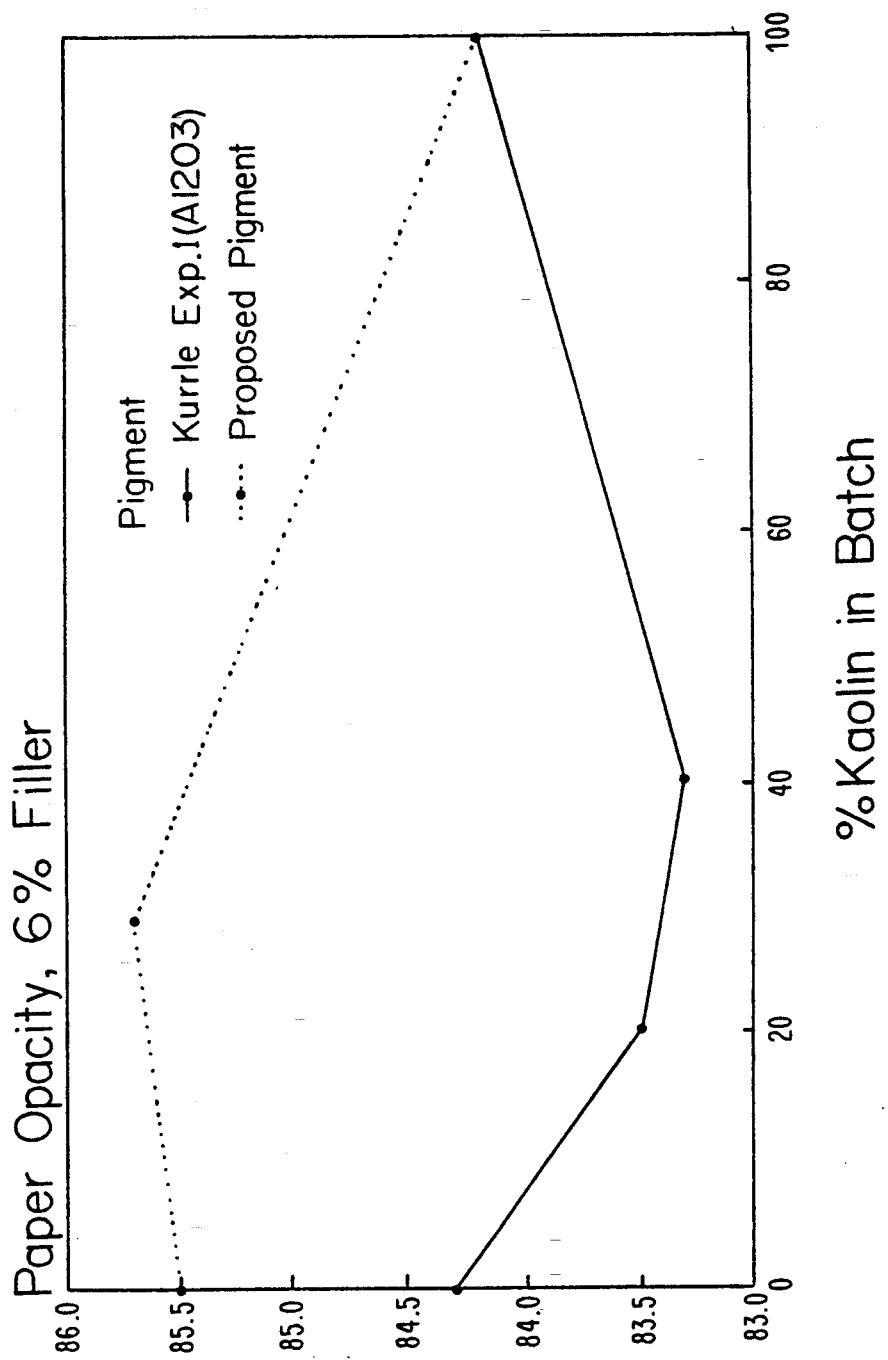
FIG. 9 is a paper performance comparison of an alumina analog of a product of U.S. Pat. No. 4,026,721 of Kurrle, Example 1.

Evaluation of these pigments in paper clearly shows that the optical performance of pigments produced by the Kurrle patent are inferior to the pigments of the invention (FIG. 9).

Performance in paper can typically be related to a pigment's ability to scatter light. Therefore, the Kubelka-Munk Scattering Coefficients were calculated using the appropriate equations. Comparison of the data at 6% filler level clearly shows the superior light scattering ability of the claimed pigment as compared with the pigments produced using methods taught by the Kurrle patent.

| Comparison of Scattering Coefficients | |
|---|---|
| Pigment (@ 60% Kaolin) | Scattering Coefficients @ 6% filler, S, $cm^2/g$ |
| Kurrle (CaSil) | 1834 |
| Kurrle ($Al_2O_3$) | 1340 |
| Pigment of this invention | 2389 |

A detailed evaluation of pigment structure as illustrated by the attached Scanning Electron Micrographs of FIGS. 6A, 6B and 6C and 7A, 7B and 7C, clearly shows the difference in the two pigments. It is evident that the Alumina-Kurrle pigment does not coat the kaolin particles. The micrographs show many kaolin particles that remain discreet after the formation of the pigment unlike the claimed pigment in which the kaolin particles are almost totally coated with precipitate.

It is clearly evident from the data presented that the claimed pigments and methods of preparation are not similar to the calcium silicate-Kurrle pigments. The Alumina analog pigment, while being similar in composition, differs in structure, appearance and most importantly, function, from the pigments of the claimed invention.

EXAMPLE 8

A pigment is produced by preparing 730.0 g of an aqueous reaction medium at 60° C. To this medium is added 1447.2 g of sodium silicate solution containing 5.40% $Na_2O$ and 17.00% $SiO_2$ at 60° C., simultaneously with 623.7 g of aluminum sulfate solution containing 17.90% $Al_2(SO_4)_3$. Sufficient agitation is maintained to suspend the pigment particles. Approximately 5 minutes after the start of the simultaneous additions, 206.36 g of ground calcium carbonate slurry (ground limestone) with 50% solids is added.

Upon completion of simultaneous addition, an additional 311.85 g of aluminum sulfate is added to reduce the slurry pH to 6.5. The pigment slurry is recovered, filtered, washed and dried. A finely divided composite pigment results.

EXAMPLE 9

A pigment is produced by preparing 1031.41 g of an aqueous reaction medium containing 0.65% $Mg(OH)_2$. Clarified alum is added slowly with agitation to yield a concentration of 0.92% $Al_2(SO_4)_3$ at 60° C. At this point, simultaneous addition of alum and sodium silicate containing 28.33% $Al_2(SO_4)_3$ at 60° C. and 8.96% $Na_2O$ and 22.39% $SiO_2$ at 60° C., respectively is started and continued at a slow rate maintaining good agitation for 6.5 minutes. At this point, addition of 346.36 g of a slurry of calcium carbonate (Dolomite Limestone) containing 50% solids is started while maintaining sufficient agitation to suspend the pigment particles. Simultaneous additions are continued for 35 minutes. The pigment is recovered, washed, dried and milled. A finely divided composite pigment results.

For comparison purposes, the pigment of Example 9 containing 25% ground calcium carbonate was compared with a second sample produced by combining, as a simple mixture, 75% synthetic sodium magnesium alumino silicate and 25% ground calcium carbonate. Using standard TAPPI and ISO methods described above, handsheets were produced and evaluated as shown in the following table. It is clearly evident from the table that the performance of the novel coalesced pigment is superior in opacity and brightness to the weighted average performance calculated from the individual components.

| PAPER PERFORMANCE COMPARISON | | | | |
|---|---|---|---|---|
| | TAPPI OPACITY | | ISO BRIGHTNESS | |
| | 2% Filler | 4% Filler | 2% Filler | 4% Filler |
| Novel Pigment | | | | |
| 25% Dolomite Limestone | 87.5 | 89.0 | 59.9 | 61.4 |
| Simple Mixture | | | | |
| A. Synthetic Alumino Silicate | 87.4 | 88.9 | 59.9 | 62.2 |
| B. Ground Limestone | 86.0 | 86.5 | 56.7 | 56.2 |
| Calculated Weight Avg. 75%a + 25%b | 87.1 | 88.3 | 59.1 | 60.7 |
| Unfilled | 85.5 | — | 58.1 | — |

EXAMPLE 10

Using TAPPI standard methods handsheets were produced from a groundwood furnish. The sheets containing novel pigments having two types of carbonate mineral are compared to other common fillers utilized in the paper industry in the following table:

| TYPICAL PAPER PERFORMANCE | | | | |
|---|---|---|---|---|
| | TAPPI OPACITY | | ISO BRIGHTNESS | |
| | 2% Filler | 4% Filler | 2% Filler | 4% Filler |
| Novel Pigment | | | | |
| 25% Dolomite Limestone (Example 8) | 88.8 | 89.9 | 55.8 | 58.2 |
| Novel Pigment | | | | |
| 25% Calcium Carbonate (Example 9) | 88.5 | 90.0 | 56.1 | 58.5 |
| Synthetic Alumino Silicate | 88.1 | 89.5 | 55.9 | 58.0 |
| Calcined Clay | 88.7 | 89.8 | 56.0 | 58.1 |
| Unfilled | 86.6 | — | 53.9 | — |

The pigments of this invention (containing up to 25% low cost mineral substrate) offer superior performance at 4% filler level to calcined clay or synthetic alumino pigments.

The invention has been described herein with reference to certain preferred embodiments. However, as obvious variations thereon will become apparent to those skilled in the art, the invention is not to be considered as limited thereto.

We claim:

1. A composite product consisting essentially of an inert mineral nucleus selected from the group consisting of kaolins, leached clays, talcs, micas, serpentinite, montmorillonites, calcium carbonate, magnesium carbonate, ground limestone, diatomaceous earth, and mixtures thereof, coated with a substantially continuous uniform coating consisting of discreet particles, substantially all of the discreet particles having a diameter of less than one micron, of an active paper pigment selected from the group consisting of synthetic alkali metal silicates, alkali metal aluminosilicates, alkaline earth metal aluminosilicates, alkaline earth alumina carbonates, and mixtures thereof, wherein said composite product is produced by
  1) providing individual solutions of the reactants needed to form the coating;
  2) initially combining some of the reactant solutions in a reactor until active paper pigment coating material begins to form;
  3) adding a slurry of uncoated mineral nucleus to the reactor;
  4) adding the remaining reactant solutions under alkaline conditions of the reactor, at least two of the needed reactants being added simultaneously; and
  5) recovering the product.

2. A composite product according to claim 1 wherein at least 80% of the paper pigment is encapsulated by the paper pigment.

3. A composite product according to claim 1 wherein the coating of the paper pigment is at least about 0.3 microns in thickness.

4. A composite product according to claim 1 wherein the nucleus is kaolinite and the coating is alkali metal alumino magnesium silicate.

5. A composite product according to claim 1 wherein the mineral nucleus is a kaolin clay and the continuous coating comprises a formation in situ of a sodium alumino magnesium silicate.

6. A composite product consisting essentially of an inert mineral nucleus selected from the group consisting of kaolins, leached clays, talc, micas, serpentinite, montmorillonites, calcium carbonate, magnesium carbonate, ground limestone, diatomaceous earth, and mixtures thereof coated with a substantially continuous uniform coating consisting of discreet particles, substantially all of the discreet particles having a diameter of less than one micron, of an active paper pigment selected from the group consisting of synthetic alkali metal silicates, alkali metal silicates, alkali metal alumina silicates, alkaline earth metal alumina silicates, alkaline earth alumina carbonates, and mixtures thereof wherein said composite product is produced by
  (a) forming individual aqueous media containing reagents necessary to form said active paper pigment;
  (b) forming an aqueous slurry of uncoated mineral nucleus;
  (c) providing an agitated reactor vessel for receipt of said reagents and slurry;
  (d) adding a sufficient amount of reagents necessary to form said active paper pigment to said reactor vessel so at to form at least a portion of said active mineral nucleus;
  (e) adding said slurry of mineral nucleus;
  (f) continuous simultaneous addition of the major portion of said active paper pigment reagents and said aqueous slurry of said mineral nucleus under alkaline reaction conditions at temperatures ranging from about 40° to 100° C. until all reagents are added to the mixture; and
  (g) recovering the solid composite product.

7. A composite produce according to claim 6 wherein at least 80% of the nucleus is encapsulated by the paper pigment.

8. A composite product according to claim 6 wherein the coating of the paper pigment is at least about 0.3 microns in thickness.

9. A composite product according to claim 6 wherein the nucleus is kaolite and the coating is alkali metal alumina magnesium silicate.

10. A composite product according to claim 6 wherein the mineral nucleus is a kaoline clay and the continuous coating is a sodium alumina magnesium silicate.

11. A composite product according to claim 6 wherein the mineral nucleus is a kaolin clay and the continuous coating comprises sodium alumina magnesium silicate, wherein said composite product is produced by
  (a) forming aqueous solutions of sodium silicate and aluminum sulfate;
  (b) forming aqueous slurries of magnesium hydroxide and kaolin clay;
  (c) adding at least a portion of said aluminum sulfate and said magnesium hydroxide slurry to an agitated reactor vessel;
  (d) beginning the addition of said sodium silicate solution in a sufficient amount to form at least sodium magnesium aluminosilicate;
  (e) adding said kaolin slurry;
  (f) continuing the simultaneous addition of all of said reagents until each reagent has been added to said agitator reactor, the addition of the reagents to the reactor being carried under conditions of a temperature of about 40°–100° C. and an alkaline pH;
  (g) thereafter continuing the addition of sodium silicate solution until a final pH of 8.0 to 10.0 is obtained; and
  (h) recovering the formed solid composite product.

* * * * *